United States Patent

Meuschke et al.

[11] 4,319,725
[45] Mar. 16, 1982

[54] APPARATUS FOR VERTICALLY TUBING A HEAT EXCHANGER

[75] Inventors: Robert E. Meuschke; Walter J. Vandriak, both of Pittsburgh, Pa.

[73] Assignee: Westinghouse Electric Corp., Pittsburgh, Pa.

[21] Appl. No.: 132,567

[22] Filed: Mar. 21, 1980

[51] Int. Cl.³ .............................................. F16L 3/22
[52] U.S. Cl. ............................ 248/68 R; 29/157.3 C; 206/443; 248/68 CB; 248/544; 269/43
[58] Field of Search ................ 248/68 R, 68 CB, 544, 248/68 R; 206/443; 29/157.3, 726; 211/49 S; 138/111, 112, 113, 117; 174/157, 40 CC, 167, 128 R; 165/76, 80 R, 172, 153, 157, DIG. 13; 269/43, 44, 37, 287

[56] References Cited

U.S. PATENT DOCUMENTS

| | | | |
|---|---|---|---|
| 918,816 | 4/1909 | Bartlett | 269/44 |
| 1,350,236 | 8/1920 | Pierce, Jr. | 269/37 |
| 1,481,169 | 1/1924 | Witte | 29/726 |
| 1,852,363 | 5/1932 | Parent | 248/68 R |
| 2,728,452 | 12/1955 | Kantola et al. | 206/443 |
| 2,830,799 | 4/1958 | Amerio | 248/68 R |
| 3,023,989 | 3/1962 | White | 248/68 CB |
| 3,128,736 | 4/1964 | Norris et al. | 269/43 X |
| 3,135,382 | 1/1964 | Crickard et al. | 206/443 |
| 3,682,422 | 8/1972 | Evans | 248/68 CB |
| 3,813,749 | 6/1974 | Peake et al. | 269/287 |
| 4,202,085 | 5/1980 | Vollmer | 29/157.3 C |

FOREIGN PATENT DOCUMENTS

| | | | |
|---|---|---|---|
| 2259027 | 8/1975 | France | 206/443 |
| 1134255 | 11/1968 | United Kingdom | 248/68 CB |

Primary Examiner—James T. McCall
Attorney, Agent, or Firm—E. F. Possessky

[57] ABSTRACT

A support framework for a double column of U-shaped tubes of a heat exchanger for vertically suspending the tubes above the heat exchanger during a tubing operation is shown. That portion of the framework which supports the U-bends of the tubes is primarily used to support the tubes above the tubesheet and lower the tubes into the tubesheet as a unit. The U-bend support framework includes a vertical member in which the separate tubes of the double column are clamped to normally prevent movement of the tubes therein and also permits individual release of the tubes when necessary.

7 Claims, 4 Drawing Figures

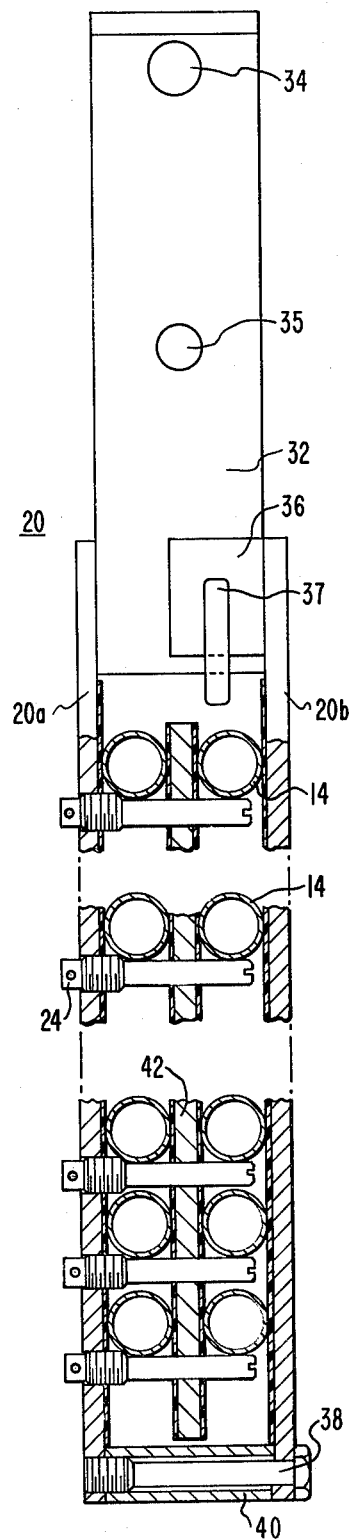
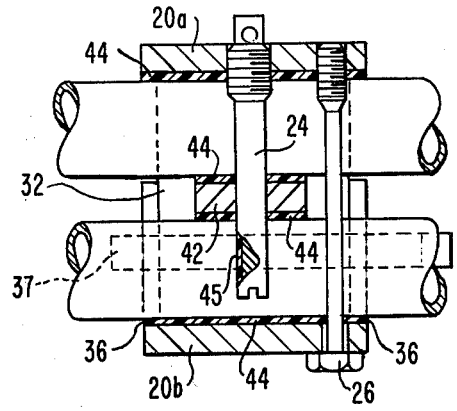
FIG. 3
FIG. 4

APPARATUS FOR VERTICALLY TUBING A HEAT EXCHANGER

BACKGROUND OF THE INVENTION

1. Field of the Invention

This invention relates to a framework assembly for enclosing an array of heat exchanger tubes and providing protection during shipping and/or providing support of the tubes during a vertical tubing operation. More particularly, the invention relates to the particular framework adjacent and engaging the U-bend portion of the heat exchanger tubes which, during the final loading of the tubes into the heat exchanger, supports the heat exchanger tubes and provides a clamping force preventing relative movement of the tubes while permitting the individual release of each tube within the array of tubes supported by the framework.

2. Description of the Prior Art

This invention is an improvement of the apparatus described in copending U.S. patent application Ser. No. 965,017, filed Nov. 30, 1978, now U.S. Pat. No. 4,202,085, and having a common assignee of the present invention.

In the apparatus of the above-identified application, a U-tube support framework is shown in which a double column of U-shaped heat exchanger tubes are disposed in proper arrangement for subsequent vertical insertion into the tubesheet of a heat exchanger such as a steam generator. The tubes are disposed and retained therein in the relative positions in which the tubes will be finally installed in the tubesheet. Such framework generally comprises an upper rack portion corresponding to the U-bend portion of the tubes and having structure for lifting the tubes to a vertical position, and a rectangular lower portion for protecting the tubes during shipping and aligning the long straight-leg portions of the tubes prior to installation. Further, proper disposition of the legs within the lower portion is assurance that the tubes are properly formed and aligned for insertion into aligned apertures in the support plates and tubesheet of the heat exchanger.

The sequence for vertically inserting the tubes generally comprises sequentially removing serially connected sub-assemblies of the lower portion of the assembly as the U-tubes are lowered from an elevated aligned position above the tube support plates of the heat exchanger by a hoist attached to the rack portion of the framework. Guides in the lower ends of the tubes guide the tubes through aligned apertures in the tube support plates and finally into the tubesheet. However, it has been found that regardless of the care taken in properly aligning the tubes, there remains the probability that at least one end of one tube in the array, which in this instance is a double column of U-tubes enclosed by the framework assembly, will be prevented from fully entering the tubesheet because of frictional engagement between the tube and any or all of the openings through which it passes. Further, because great care must be exercised to prevent any scratching of the tubes that may lead to a premature failure, once any one end of a tube is frictionally prevented from further movement under its own weight, additional force, up to some preselected maximum force which corresponds to the tube being inserted without concern for scratching, must be applied to complete the proper positioning of the tube within the heat exchanger.

As the upper rack portion of the above-identified patent application supported the U-bend portion of the tubes without clamping them, the tubes were generally free to move with respect to one another and if any end of a tube became frictionally engaged to the extent that during further lowering of the support rack such end did not move downwardly, the tube would be displaced axially in the rack (i.e. with both ends of the tube initially being flush, preventing one end from moving while the remainder of the tube was being lowered would cause the opposite end to move downwardly an exaggerated amount and was referred to as "snaking"). Thus, in such a rack portion of the prior art, if a tube became frictionally engaged, further lowering of the tube bundle caused increasing misalignment of the tube ends. To alleviate this problem, it was necessary to remove from the rack the tube which became stuck, and insert it manually. However, because of the construction of the above-referenced rack, it was necessary to free all the tubes supported by the rack. In such instances, the U-bends of the tubes would become unrestrained and free to move about, causing them to become entangled and further complicating the tubing procedure.

SUMMARY OF THE INVENTION

The present invention provides a U-bend support rack for the U-tubes of a heat exchanger and includes support structure which provides an individual clamping force on each U-tube retained therein such that each tube is prevented from axial movement, caused by one end becoming frictionally engaged, until a predetermined vertical force on that tube is exceeded. However, once such force is exceeded and axial displacement of a tube within the rack is noticed, the U-bend support rack of the present invention can be disassembled in a manner that permits individual release of the tubes so each preceding tube (in the order of the lowermost tube to uppermost tube in the rack) can be properly manually positioned prior to the next tube being released, thereby preventing the unrestrained freedom of all U-bend portions previously permitted when it was necessary to remove any frictionally engaged tube.

BRIEF DESCRIPTION OF THE DRAWINGS

FIG. 3 is a cross-sectional view taken generally along line III—III of FIG. 2; and FIG. 4 is a cross-sectional view taken generally along line IV—IV of FIG. 2.

DESCRIPTION OF THE PREFERRED EMBODIMENT

As previously stated, the U-bend rack portion of the present invention is an improvement to the rack portion fully described in commonly owned copending U.S. patent application Ser. No. 965,017, now U.S. Pat. No. 4,202,085, and which is herein incorporated by reference for its description of the generally common structure permitting aligned retention of a double column of U-bend heat exchanger tubes therein. Also, it should be pointed out that the improved features of the present invention generally are not utilized unless, in vertically inserting a bundle of U-bend heat exchanger tubes into aligned apertures in the tube support plates and the tubesheet of the heat exchanger, a problem arises such that any one of the tubes within the bundle becomes frictionally engaged to the extent that further insertion under its own weight is prevented. Under these circumstances, with the U-bend rack of the present invention, by virtue of all tubes of the bundle being clamped therein, an additional force, up to a preselected maximum, is applied to the frictionally engaged tube (i.e. a portion of the weight of the remaining tubes is transmitted to the frictionally engaged tube). If this force is insufficient to cause the tube to continue its downward movement, the present rack permits individual release of the tubes for selective manual insertion without requiring release of all the tubes simultaneously.

Figure 1:
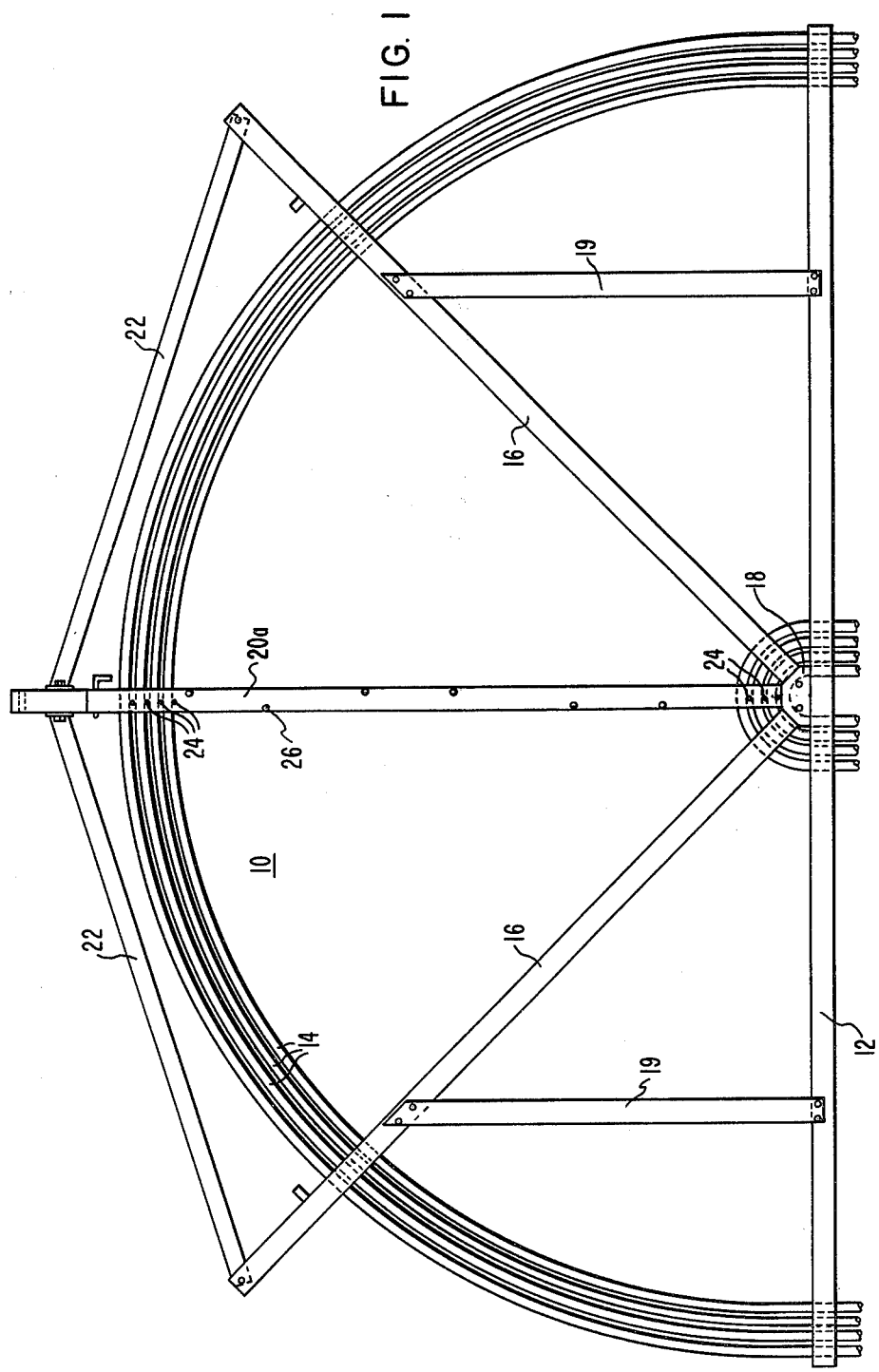
FIG. 1 is an elevational view of a U-bend rack for supporting the U-bend portion of a double column of U-shaped heat exchanger tubes.

Thus, referring to FIG. 1, the U-bend rack of the present invention is shown and, as is known, forms the upper portion of a complete tube support assembly described in the referenced patent application for supporting a double column of heat exchanger tubes in proper alignment. The U-bend rack 10 comprises a chordal member 12 extending transversely across the tube column 14 (only a few outermost and innermost tubes of the single column being shown) at the beginning of the U-bends of the tubes. A pair of radially extending arms 16 extend upwardly in generally a 45° angle from a hub plate 18 at the center of the chordal member 12. A pair of strut members 19, one per each arm 16, interconnect the radial arms 16 to the chordal member 12. Also, a vertically extending arm 20 is connected at the hub plate 18 to extend vertically therefrom to above the outermost tube in the tube bundle 14. A pair of opposed connecting members 22 connect the outermost ends of each radial arm 16 to the vertical arm 20 subadjacent the outermost end thereof to complete the framework of the U-bend rack 10.

It is to be understood that the assembled rack 10 as above described is, under normal circumstances, used to support the tubes vertically above the support plates and tubesheet of the heat exchanger in aligned configuration with the apertures in such heat exchanger structure. However, it is also to be understood that all connections between the various identified parts can be removed (i.e. the parts are bolted together) and the parts individually removed from one another. Thus, in accordance with the present invention, when circumstances require individual manual insertion of a tube as previously explained, the chordal member 12, hub plate 18, radial arms 16, struts 19, and connecting members 22 are removed leaving the tubes 14 retained within the vertical arm 20 to prevent the U-bends of the tubes from becoming entangled. The tubes are then individually released from the vertical arm 20 starting at the lowermost tube and continuing upwardly until the frictionally engaged tube is released from the arm 20 and manually set in proper position within the tubesheet.

As the vertical arm 20 remains suspended from the hoist, the remaining tubes retained in the arm 20 (i.e. those above the frictionally engaged tube) can be simultaneously lowered into place or lowered until any other tube therein becomes frictionally engaged, in which instance the procedure of individually releasing the remaining retained tubes is repeated.

Figure 2:
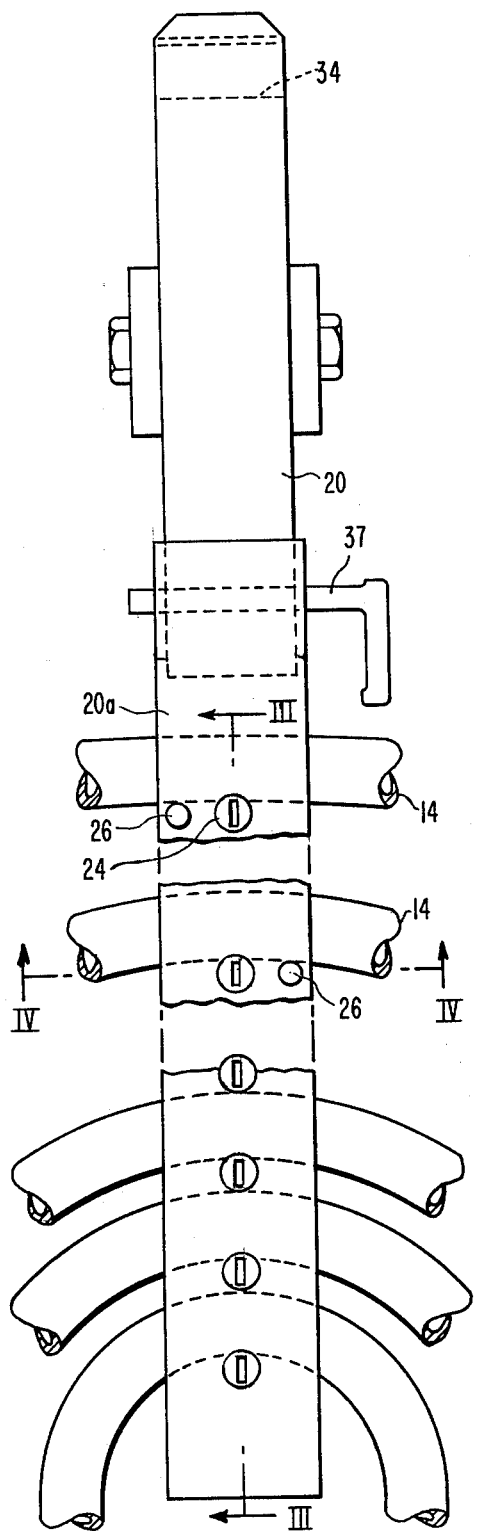
FIG. 2 is an enlarged elevational view of a portion of the rack of FIG. 1.

Thus, referring to FIG. 2, the vertical arm 20 is shown after the remaining support structures (i.e. chordal member 12 and hub plate 18, radial arms 16, struts 19 and connecting members 22) have been removed but the tubes are retained between opposing members of the arm at the U-bend of each tube. In this view it is noted that the arm 20 includes a vertical row of horizontal support pins 24 threaded thereinto and spaced apart a vertical distance sufficient to permit the tubes to pass therebetween. A plurality of clamping bolts 26 are also received through the opposed members 20a–20b of the vertical arm for the purpose of clamping together at various vertical locations these opposed vertical members, which comprise the arm 20 as described in more detail with reference to FIGS. 3 and 4.

Thus, as seen in FIGS. 3 and 4, the vertical arm 20 comprises a front member 20a and a back member 20b in spaced opposed facing relationship. A rectangular bar member 32 is welded to the uppermost end of front member 20a and defines an aperture 34 for receipt of the hook of the hoist which lifts the rack 10, and a lower aperture 35 for the bolts of the connecting members 22. The back member 20b has, at its upper end, wing members 36 in generally facing engagement with the side walls of the bar member 32 with these parts having, when properly positioned, concentric openings therethrough for receipt of a removable pin member 37 for releasably attaching the front and back members together at the upper end. The rectangular bar member 32 also provides the proper spacing permitting two columns of tubes 14 to closely fit between the opposed front and back members 20a and 20b. The lowermost end of the two opposed members are also joined together by a bolt 38 through the back member 20b and threaded into the front member 20a and having a spacer member 40 maintaining proper spatial relationship between the opposed members 20a, 20b at this end. The opposed members are also secured together by a plurality of clamping bolts 26 vertically separated and generally adjacent the edges of the opposed members to be in a non-interfering position with respect to the tubes passing therebetween.

The tubes 14 are supported on the mid-point of their U-bends by the horizontal support pins 24 threaded into the front member 20a and generally extending across the spatial separation between the members to adjacent the back member 20b. A vertically extending intermediate spacer plate 42 has a vertical row of apertures concentric with the pins 24 extending from the front member 20a and, as seen, the intermediate spacer plate 42 is disposed between the opposed members and terminates at both ends inwardly of the ends of the opposed members. The intermediate spacer plate 42 provide a solid separation between horizontally adjacent tubes 14 of the two columns supported within the vertical arm 20.

The inner tube-engaging faces of the front and back opposed members 20a, 20b and both tube-engaging surfaces of the spacer plate 42 have a layer of resilient (i.e. Neoprene) material 44 to eliminate metal-to-metal contact between the support structure and the tubes 14. Also, the unthreaded portion of the support pins 24 are coated with a layer of non-marring low friction material 45 (such as a layer of polyvinylidene fluoride).

With this arrangement the connecting bolts 26 can be torqued to a predetermined value (on the order of 30 inch pounds) pulling the opposed members 20a, 20b together to provide a clamping force on the tubes 14 therebetween such that each tube will remain stationary as clamped between the opposed members unless the force on that tube exceeds a preselected amount. (If a tube becomes frictionally engaged within the tubesheet, the inability of the tube to move while the remaining tubes in the supported array are lowered will cause it to support some weight of the assembly. When such weight exceeds a predetermined amount, further lowering causes slipping of the tube within the arm 20). It has been found that such forces in the range of 50 to 100 pounds are acceptable; however, above that range, further force on the tube may cause undesirable scratching. Thus, if this preselected force is exceeded, the clamping force permits the tube to move within the vertical arm 20.

Once it is determined either through observation or by automatic sensing devices that such movement of any tube has occurred, further lowering of the arm 20 is halted and the tubes 14 are individually removed from the support assembly until the frictionally engaged tube is freed.

To accomplish individual lowering of each tube 14 once it is determined to be necessary, the U-bend support rack 10 of FIG. 1 is disassembled as described so that the tubes 14 are solely supported on the pins 24 in the vertical arm assembly 20 of FIGS. 3 and 4. In this position the lower bolt 38 and spacer 40 are removed. Then starting with the lowermost support pin 24, each pin is manually unthreaded and withdrawn to the extent to free the tube resting thereon between the front member 20a and the intermediate plate 42. This freed tube is then manually positioned within the heat exchanger and the support pin 24 is then fully withdrawn to free the adjacent tube which is likewise manually lowered to the desired position. Such process is repeated, advancing upwardly until the frictionally engaged tube is freed and manually placed in the proper position within the tube-sheet, whereupon the vertical arm 20 can be lowered by the hoist to continue the simultaneous insertion of the remaining tubes clamped therein. Once all the tubes are in place, the support rack 10 or vertical arm 20 is removed from the tubes.

We claim:

1. A frame-like structure for verticaly supporting a plurality of U-bend heat exchanger tubes including a vertical arm member for clamping the tubes therein at generally the midpoint of the U-bend portion thereof comprising:

a pair of spaced opposed vertically extending members;

upper spacer means adjacent the upper end of said members to provide a predetermined horizontal spatial separation therebetween;

a removable spacer means adjacent the lower end of said members to provide a like predetermined spatial separation therebetween at the lower end;

a vertical row of horizontal support pins removably received in at least one of said members and extending into said spatial separation a distance sufficient to supportingly engage a tube projecting transversely between said members; and a plurality of vertically spaced horizontally projecting interconnecting means for drawing said vertically extending members together a distance to clamp the tubes supported therebetween with a predetermined clamping force.

2. Structure according to claim 1 wherein a plurality of horizontally adjacent tubes are supported on each support pin and wherein said structure further includes a vertically extending intermediate spacer means for separating horizontally adjacent tubes, said intermediate spacer extending vertically generally from the upper spacer means to the lower spacer means and having a vertical row of apertures in alignment and sized to receive said support pins therethrough whereby each support pin supports horizontally adjacent tubes on opposite sides of said intermediate spacer.

3. Structure according to claim 2 wherein said lower spacer means is removable, and removal thereof provides unobstructed entry into the spatial separation between said vertically extending members to permit said tubes to be vertically lowered there out of once said support pins are moved to a non-support position.

4. Structure according to claim 3 wherein said vertically extending members are attached to said upper space member and said last-named member includes structure for engagement by a hoist for vertically lifting said frame-like structure and said tubes therefrom.

5. Structure according to claim 3 wherein said frame-like structure, support pins and intermediate spacer means are fabricated from metal, and wherein all surfaces thereof which contact said tubes supported therein are coated with a non-marring layer to minimize scratching said tubes in said structure.

6. Structure according to claim 5 wherein said coating on said vertically extending members and said intermediate spacer means is a layer of resilient material.

7. Structure according to claim 6 wherein said interconnecting means comprises bolts extending between said vertically extending members and wherein said bolts are tightened to a predetermined torque to provide sufficient clamping force on said tubes to maintain said tubes generally stationary clamped therein against external forces up to about 100 pounds.

* * * * *